United States Patent
Jung et al.

(10) Patent No.: US 11,770,744 B2
(45) Date of Patent: Sep. 26, 2023

(54) RANDOM ACCESS SKIP CONFIGURATION

(71) Applicant: Lenovo (Singapore) PTE. LTD., New Tech Park (SG)

(72) Inventors: Hyejung Jung, Northbrook, IL (US); Prateek Basu Mallick, Dreieich (DE); Joachim Loehr, Wiesbaden (DE); Ravi Kuchibhotla, Chicago, IL (US); Vijay Nangia, Woodridge, IL (US); Ebrahim MolavianJazi, Lincolnwood, IL (US); Robert T. Love, Barrington, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 238 days.

(21) Appl. No.: 17/199,210

(22) Filed: Mar. 11, 2021

(65) Prior Publication Data

US 2021/0204178 A1    Jul. 1, 2021

Related U.S. Application Data

(63) Continuation of application No. 16/417,428, filed on May 20, 2019, now Pat. No. 10,972,948.
(Continued)

(51) Int. Cl.
*H04W 36/00* (2009.01)
*H04L 5/00* (2006.01)
*H04W 74/08* (2009.01)

(52) U.S. Cl.
CPC ....... *H04W 36/0055* (2013.01); *H04L 5/0048* (2013.01); *H04W 74/0833* (2013.01)

(58) Field of Classification Search
CPC ......... H04W 36/0055; H04W 74/0833; H04W 48/12; H04W 36/0077; H04L 5/0048
(Continued)

(56) References Cited

U.S. PATENT DOCUMENTS

2014/0128058 A1\* 5/2014 Ji .................... H04W 24/04
                                                      455/423
2015/0223181 A1   8/2015 Noh
(Continued)

OTHER PUBLICATIONS

3GPP, "3rd Generation Partnership Project; Technical Specification Group Radio Access Network; NR; Physical layer procedures for control (Release 15)", 3GPP TS 38.213 V15.1.0, Mar. 2018, pp. 1-77.
(Continued)

*Primary Examiner* — Mang Hang Yeung
(74) *Attorney, Agent, or Firm* — Kunzler Bean & Adamson

(57) ABSTRACT

Apparatuses, methods, and systems are disclosed for random access skip configuration. One method includes receiving a handover command message from a first cell, wherein: the handover command message includes first information that indicates a configuration of a second cell, random access channel resources on the second cell, and a first reference signals associated with the second cell; each of the first reference signals is associated with a random access channel resource; second information indicates skip configurations and second reference signals are associated with the second cell; and each of the second reference signals is associated with a random access skip configuration. The method includes receiving a first set of downlink reference signals and a second set of downlink reference signals. The method includes, selecting a first downlink reference signal and determining whether to perform a random access procedure.

20 Claims, 7 Drawing Sheets

Related U.S. Application Data

(60) Provisional application No. 62/673,774, filed on May 18, 2018.

(58) Field of Classification Search
USPC .......................................................... 370/331
See application file for complete search history.

(56) References Cited

U.S. PATENT DOCUMENTS

| | | | |
|---|---|---|---|
| 2018/0332507 A1 | 11/2018 | Fujishiro et al. | |
| 2019/0141590 A1 | 5/2019 | Li et al. | |
| 2019/0253986 A1* | 8/2019 | Jeon | H04B 7/0626 |
| 2019/0327769 A1* | 10/2019 | Yang | H04B 7/088 |

OTHER PUBLICATIONS

3GPP, "3rd Generation Partnership Project; Technical Specification Group Radio Access Network; NR; Radio Resource Control (RRC) protocol specification (Release 15)", 3GPP TS 38.331 V15.1.0, Mar. 2018, pp. 1-268.

3GPP, "NR; NR and NG-RAN Overall Description" Stage 2, Release 15, TS 38.300 V15.1.0, Mar. 2018, pp. 1-71.

ZTE, "Discussion on the support of MBB and RACH-less in NR", R2-1800436, 3GPP TSG-RAN WG2 Nr Ad hoc 0118, (revision of S2-1712603), Jan. 22-26, 2018, pp. 1-8.

Motorola Mobility, Lenovo, "Remaining details on random access procedure", R1-1718696, 3GPP TSG RAN WG1 #90bis, Oct. 9-13, 2017, pp. 1-4.

3GPP, "Evolved Universal Terrestrial Radio Access (E-UTRA); Radio Resource Control (RRC); Protocol specification (Release 15)", TS 36.331 V15.1.0, Mar. 2018, pp. 1-786.

Huawei, "Relationship between beam failure recovery and RLF", R1-1715720, 3GPP TSG RAN WG1 Meeting AH NR#3, Sep. 18-21, 2017, pp. 1-5.

Motorola Mobility, Lenovo, "NR mobility enhancement", R1-1904937, 3GPP TSG RAN WG1 #96bis, Apr. 3-12, 2019, pp. 1-3.

Lenovo, Motorola Mobility, "Dedicated PRACH resource for beam failure recovery", R2-1805204, 3GPP TSG-RAN WG2 Meeting #101bis, Apr. 16-20, 2018, pp. 1-3.

Motorola Mobility, Lenovo, "Remaining details for BWP operation", 3GPP TSG RAN WG1 Meeting #93 R1-1807277, May 21-25, 2018, pp. 1-3.

* cited by examiner

RANDOM ACCESS SKIP CONFIGURATION

CROSS-REFERENCE TO RELATED APPLICATIONS

This application is a continuation of U.S. patent application Ser. No. 16/417,428 filed on May 20, 2019, which claims priority to U.S. Patent Application Ser. No. 62/673,774 entitled "ENHANCED MOBILITY HANDLING" and filed on May 18, 2018 for Hyejung Jung, all of which are incorporated herein by reference in their entirety.

FIELD

The subject matter disclosed herein relates generally to wireless communications and more particularly relates to random access skip configuration.

BACKGROUND

The following abbreviations are herewith defined, at least some of which are referred to within the following description: Third Generation Partnership Project ("3GPP"), 4$^{th}$ Generation ("4G"), 5$^{th}$ Generation ("5G"), 5G System ("5GS"), Authorization Authentication ("AA"), Authorization Authentication Request ("AAR"), Positive-Acknowledgment ("ACK"), Application Function ("AF"), Aggregation Level ("AL"), Access and Mobility Management Function ("AMF"), Access Network ("AN"), Access Point ("AP"), Authentication Server Function ("AUSF"), Attribute Value Pair ("AVP"), Broadcast Control Channel ("BCCH"), Beam Failure Detection ("BFD"), Beam Failure Recover ("BFR"), Binary Phase Shift Keying ("BPSK"), Base Station ("BS"), Buffer Status Report ("BSR"), Bandwidth ("BW"), Bandwidth Part ("BWP"), Cell-Radio Network Temporary Identifier ("C-RNTI"), Carrier Aggregation ("CA"), CA Network ("CAN"), Contention-Based Random Access ("CBRA"), Clear Channel Assessment ("CCA"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Commercial Mobile Alert Service ("CMAS"), Core Network ("CN"), Coordinated Multipoint ("CoMP"), Cyclic Prefix ("CP"), Common Resource Block ("CRB"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMRS"), Data Radio Bearer ("DRB"), Discontinuous Reception ("DRX"), Downlink Pilot Time Slot ("DwPTS"), Enhanced Clear Channel Assessment ("eCCA"), EPS Connection Management ("ECM"), Enhanced Mobile Broadband ("eMBB"), Evolved Node B ("eNB"), Effective Isotropic Radiated Power ("EIRP"), European Telecommunications Standards Institute ("ETSI"), Earthquake and Tsunami Warning System ("ETWS"), Evolved Packet Core ("EPC"), Evolved Packet System ("EPS"), Evolved Universal Terrestrial Access ("E-UTRA"), Evolved Universal Terrestrial Access Network ("E-UTRAN"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range ("FR"), Guaranteed Bit Rate ("GBR"), 5G Node B or Next Generation Node B ("gNB"), General Packet Radio Services ("GPRS"), Guard Period ("GP"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Identity or Identifier ("ID"), Information Element ("IE"), International Mobile Equipment Identity ("IMEI"), IP Multimedia System ("IMS"), International Mobile Subscriber Identity ("IMSI"), International Mobile Telecommunications ("IMT"), Internet-of-Things ("IoT"), Internet Protocol ("IP"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Master Cell Group ("MCG"), Modulation Coding Scheme ("MCS"), Master Information Block ("MIB"), Multiple Input Multiple Output ("MIMO"), Mobility Management ("MM"), Mobility Management Entity ("MME"), Multimedia Telephony ("MMTEL"), Mobile Network Operator ("MNO"), massive MTC ("mMTC"), Maximum Power Reduction ("MPR"), Multimedia Priority Service ("MPS"), Machine Type Communication ("MTC"), Multi User Shared Access ("MUSA"), Inter-CN Interface Between a 4G MME and a 5GS AMF ("N26"), Non Access Stratum ("NAS"), Narrowband ("NB"), Negative-Acknowledgment ("NACK") or ("NAK"), Network Entity ("NE"), Network Function ("NF"), Next Generation RAN ("NG-RAN"), Non-Orthogonal Multiple Access ("NOMA"), New Radio ("NR"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation and Maintenance System ("OAM"), Orthogonal Cover Codes ("OCC"), Orthogonal Frequency Division Multiplexing ("OFDM"), Open-Loop ("OL"), Other System Information ("OSI"), Paging-Radio Network Temporary Identifier ("P-RNTI"), P-Access-Network-Info ("PANI"), Power Angular Spectrum ("PAS"), Physical Broadcast Channel ("PBCH"), Power Control ("PC"), LTE-to-V2X Interface ("PC5"), Primary Cell ("PCell"), Policy Control Function ("PCF"), Physical Cell ID ("POD"), Policy and Charging Rules Function ("PCRF"), Proxy-Call Session Control Function ("P-CSCF"), Physical Downlink Control Channel ("PDCCH"), Packet Data Convergence Protocol ("PDCP"), Physical Downlink Shared Channel ("PDSCH"), Pattern Division Multiple Access ("PDMA"), Packet Data Unit ("PDU"), Packet Data Network Gateway ("PGW"), Packet Data Network Gateway-Control ("PGW-C"), Packet Data Network Gateway-User ("PGW-U"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Provisional Response Acknowledgement ("PRACK"), Physical Resource Block ("PRB"), Primary Secondary Cell ("PS-Cell"), Physical Uplink Control Channel ("PUCCH"), Physical Uplink Shared Channel ("PUSCH"), Quasi Co-Location ("QCL"), Quality of Service ("QoS"), Quadrature Phase Shift Keying ("QPSK"), Random Access-Radio Network Temporary Identifier ("RA-RNTI"), Registration Area ("RA"), Radio Access Network ("RAN"), Radio Access Technology ("RAT"), Random Access Procedure ("RACH"), Random Access Response ("RAR"), Resource Element Group ("REG"), Radio Frequency ("RF"), Radio Link Control ("RLC"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Reference Signal ("RS"), Resource Spread Multiple Access ("RSMA"), Reference Signal Received Power ("RSRP"), Round Trip Time ("RTT"), Receive ("RX"), System Information-Radio Network Temporary Identifier ("SI-RNTI"), Serving-Call Session Control Function ("S-CSCF"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Special Cell ("SpCell"), Secondary Primary Cell ("SPCell"), Secondary Cell Group ("SCG"), Shared Channel ("SCH"), Sub-carrier Spacing ("SCS"), Session Description Protocol ("SDP"), Service Data Unit ("SDU"), Serving Gateway ("SGW"), System Information ("SI"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Session Initiation Protocol ("SIP"), Service Level Agreement ("SLA"), Session Management ("SM"), Session Management Function ("SMF"), Special Cell ("SpCell"), Single Network Slice Selection Assistance Information ("S-NSSAI"), Shortened TTI ("sTTI"), Synchronization Signal ("SS"), Synchronization Signal/Physical Broadcast Channel Block ("SSB"), Supplementary Uplink ("SUL"), Subscriber Permanent Identifier ("SUPI"), Temporary Cell-Radio Network Temporary Identifier ("TC-RNTI"), Tracking Area ("TA"), TA Group ("TAG"), TA Indicator ("TAI"), TA Update ("TAU"), Transport Block ("TB"), Transport Block Size ("TB S"), Time-Division Duplex ("TDD"), Time Division Multiplex ("TDM"), Time Division Orthogonal Cover Code ("TD-OCC"), Tunnel Endpoint Identifier ("TEID"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane ("UP"), User Plane Function ("UPF"), Uplink Pilot Time Slot ("UpPTS"), Ultra-reliability and Low-latency Communications ("URLLC"), UE Route Selection Policy ("URSP"), LTE Radio Interface ("Uu"), Vehicle-To-Everything ("V2X"), Visiting AMF ("vAMF"), Visiting NS SF ("vNSSF"), Visiting PLMN ("VPLMN"), Interconnecting Interface ("X2") ("Xn"), and Worldwide Interoperability for Microwave Access ("WiMAX").

In certain wireless communications networks, random access procedures may be performed. In such embodiments, random access procedures may be time consuming.

BRIEF SUMMARY

Methods for random access skip configuration are disclosed. Apparatuses and systems also perform the functions of the apparatus. One embodiment of a method includes receiving a handover command message from a first cell, wherein: the handover command message includes first information and second information; the first information indicates a random access channel configuration of a second cell, one or more random access channel resources on the second cell, and a first one or more downlink reference signals associated with the second cell; each of the first one or more downlink reference signals is associated with a random access channel resource of the one or more random access channel resources; the second information indicates one or more random access skip configurations for handover to the second cell and a second one or more downlink reference signals associated with the second cell; and each of the second one or more downlink reference signals is associated with a random access skip configuration of the one or more random access skip configurations. In certain embodiments, the method includes receiving a first set of downlink reference signals of the first one or more downlink reference signals and a second set of downlink reference signals of the second one or more downlink signals. In various embodiments, the method includes, in response to receiving the handover command message, selecting a first downlink reference signal from the first set of downlink reference signals and the second set of downlink reference signals. In some embodiments, the method includes determining whether to perform a random access procedure based on the first downlink reference signal.

One apparatus for random access skip configuration includes a receiver that: receives a handover command message from a first cell, wherein: the handover command message includes first information and second information; the first information indicates a random access channel configuration of a second cell, one or more random access channel resources on the second cell, and a first one or more downlink reference signals associated with the second cell; each of the first one or more downlink reference signals is associated with a random access channel resource of the one or more random access channel resources; the second information indicates one or more random access skip configurations for handover to the second cell and a second one or more downlink reference signals associated with the second cell; and each of the second one or more downlink reference signals is associated with a random access skip configuration of the one or more random access skip configurations; and receives a first set of downlink reference signals of the first one or more downlink reference signals and a second set of downlink reference signals of the second one or more downlink signals. In some embodiments, the apparatus includes a processor that: in response to receiving the handover command message, selects a first downlink reference signal from the first set of downlink reference signals and the second set of downlink reference signals; and determines whether to perform a random access procedure based on the first downlink reference signal.

One method for beam failure recovery includes receiving first information indicating a plurality of physical random access channel resources configured for beam failure recovery. In some embodiments, the method includes receiving second information indicating a command for a set of the plurality of physical random access channel resources, wherein each of the plurality of physical random access channel resources is associated with a downlink reference signal of a plurality of downlink reference signals.

One apparatus for beam failure recovery includes a receiver that: receives first information indicating a plurality of physical random access channel resources configured for beam failure recovery; and receives second information indicating a command for a set of the plurality of physical random access channel resources, wherein each of the plurality of physical random access channel resources is associated with a downlink reference signal of a plurality of downlink reference signals.

One method for synchronization signal/physical broadcast channel block configuration includes transmitting a plurality of sets of synchronization signal/physical broadcast channel blocks within a predetermined time period, wherein each set of the plurality of sets is transmitted in a different frequency range. In certain embodiments, the method comprises transmitting information indicating frequency locations corresponding to the plurality of sets of synchronization signal/physical broadcast channel blocks by explicitly indicating the frequency locations, indicating the frequency locations using common resource block index values, indicating the frequency locations using physical resource block index values, or some combination thereof.

One apparatus for synchronization signal/physical broadcast channel block configuration includes a transmitter that: transmits a plurality of sets of synchronization signal/physical broadcast channel blocks within a predetermined time period, wherein each set of the plurality of sets is transmitted in a different frequency range; and transmits information indicating frequency locations corresponding to the plurality of sets of synchronization signal/physical broadcast channel blocks by explicitly indicating the frequency locations, indicating the frequency locations using common resource block index values, indicating the frequency locations using physical resource block index values, or some combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
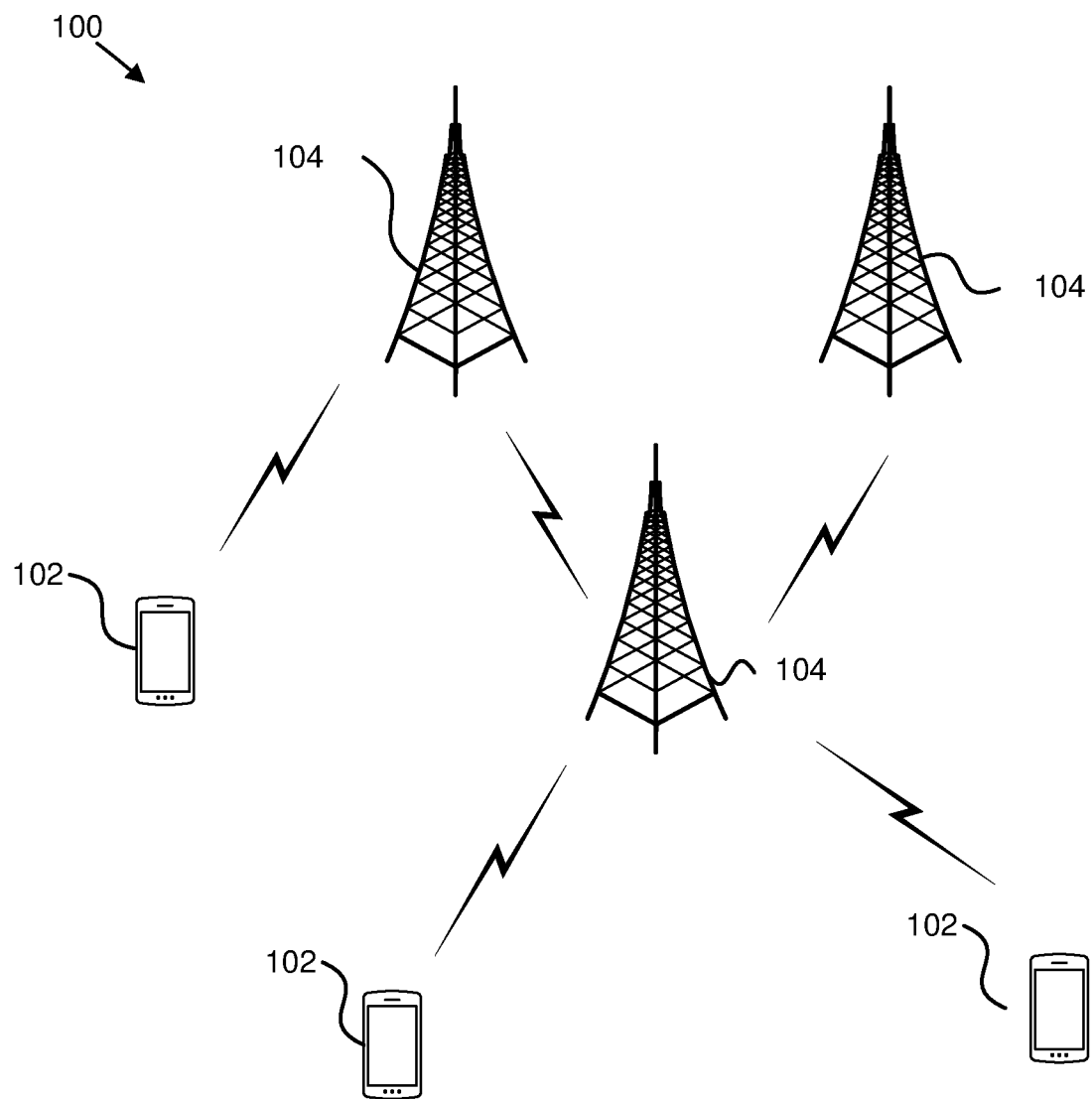
FIG. 1 is a schematic block diagram illustrating one embodiment of a wireless communication system for random access skip configuration.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for random access skip configuration. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical headmounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In certain embodiments, a remote unit 102 may receive a handover command message from a first cell, wherein: the handover command message includes first information and second information; the first information indicates a random access channel configuration of a second cell, one or more random access channel resources on the second cell, and a first one or more downlink reference signals associated with the second cell; each of the first one or more downlink reference signals is associated with a random access channel resource of the one or more random access channel resources; the second information indicates one or more random access skip configurations for handover to the second cell and a second one or more downlink reference signals associated with the second cell; and each of the second one or more downlink reference signals is associated with a random access skip configuration of the one or more random access skip configurations. In certain embodiments, the remote unit 102 may receive a first set of downlink reference signals of the first one or more downlink reference signals and a second set of downlink reference signals of the second one or more downlink signals. In various embodiments, the remote unit 102 may, in response to receiving the handover command message, select a first downlink reference signal from the first set of downlink reference signals and the second set of downlink reference signals. In some embodiments, the remote unit 102 may determine whether to perform a random access procedure based on the first downlink reference signal. Accordingly, the remote unit 102 may be used for random access skip configuration.

In some embodiments, a remote unit 102 may receive first information indicating a plurality of physical random access channel resources configured for beam failure recovery. In some embodiments, the remote unit 102 may receive second information indicating a command for a set of the plurality of physical random access channel resources, wherein each of the plurality of physical random access channel resources is associated with a downlink reference signal of a plurality of downlink reference signals. Accordingly, the remote unit 102 may be used for beam failure recovery.

In one embodiment, a network unit 104 may transmit a plurality of sets of synchronization signal/physical broadcast channel blocks within a predetermined time period, wherein each set of the plurality of sets is transmitted in a different frequency range. In certain embodiments, the network unit 104 may transmit information indicating frequency locations corresponding to the plurality of sets of synchronization signal/physical broadcast channel blocks by explicitly indicating the frequency locations, indicating the frequency locations using common resource block index values, indicating the frequency locations using physical resource block index values, or some combination thereof. Accordingly, the network unit 104 may be used for synchronization signal/physical broadcast channel block configuration.

Figure 2:
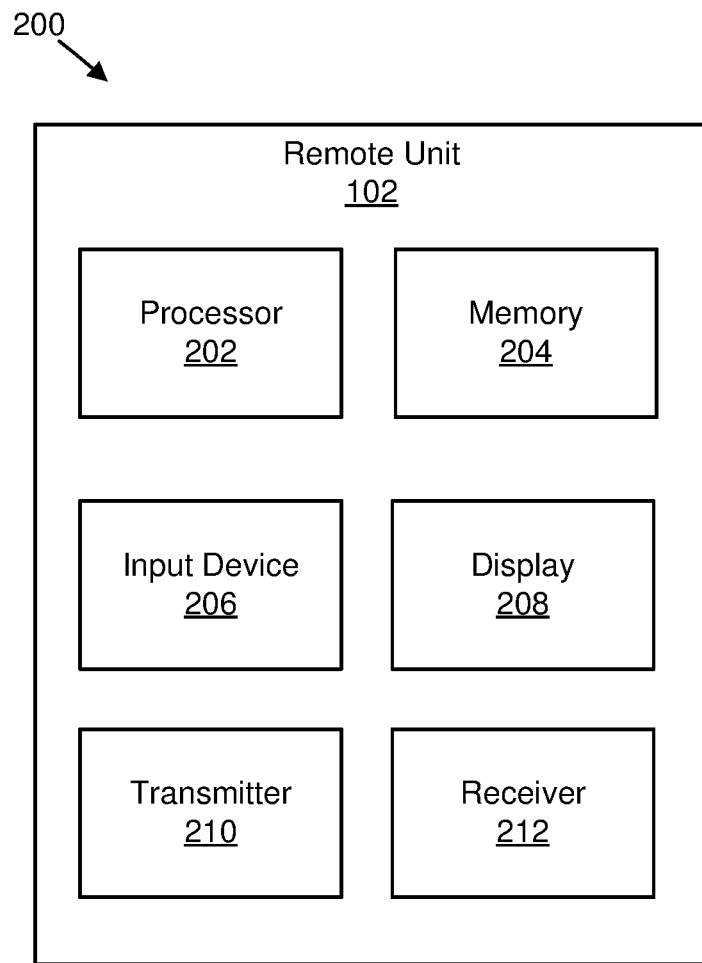
FIG. 2 is a schematic block diagram illustrating one embodiment of an apparatus that may be used for random access skip configuration.

FIG. 2 depicts one embodiment of an apparatus 200 that may be used for random access skip configuration. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 may: in response to receiving the handover command message, select a first downlink reference signal from a first set of downlink reference signals and a second set of downlink reference signals; and determine whether to perform a random access procedure based on the first downlink reference signal. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In various embodiments, the receiver 212: receives a handover command message from a first cell, wherein: the handover command message includes first information and second information; the first information indicates a random access channel configuration of a second cell, one or more random access channel resources on the second cell, and a first one or more downlink reference signals associated with the second cell; each of the first one or more downlink reference signals is associated with a random access channel resource of the one or more random access channel resources; the second information indicates one or more random access skip configurations for handover to the second cell and a second one or more downlink reference signals associated with the second cell; and each of the second one or more downlink reference signals is associated with a random access skip configuration of the one or more random access skip configurations; and receives a first set of downlink reference signals of the first one or more downlink reference signals and a second set of downlink reference signals of the second one or more downlink signals. In certain embodiments, the receiver 212: receives first information indicating a plurality of physical random access channel resources configured for beam failure recovery; and receives second information indicating a command for a set of the plurality of physical random access channel resources, wherein each of the plurality of physical random access channel resources is associated with a downlink reference signal of a plurality of downlink reference signals.

In some embodiments, the receiver 212: receives a plurality of sets of synchronization signal/physical broadcast channel blocks within a predetermined time period, wherein each set of the plurality of sets is transmitted in a different frequency range; and receives information indicating frequency locations corresponding to the plurality of sets of synchronization signal/physical broadcast channel blocks by explicitly indicating the frequency locations, indicating the frequency locations using common resource block index values, indicating the frequency locations using physical resource block index values, or some combination thereof.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
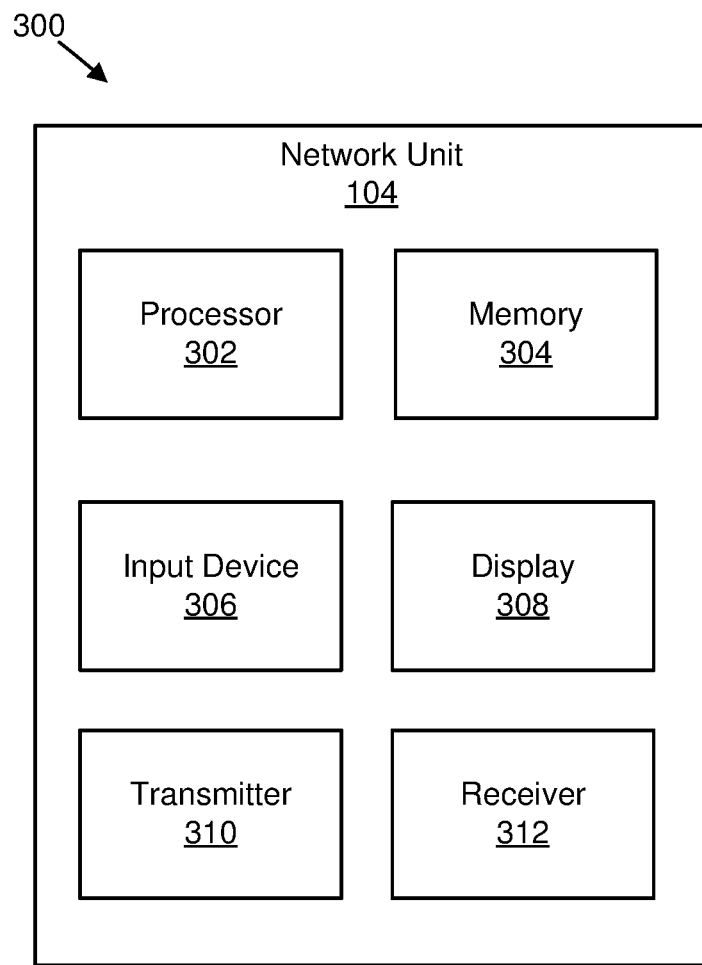
FIG. 3 is a schematic block diagram illustrating one embodiment of an apparatus that may be used for synchronization signal/physical broadcast channel block configuration.

FIG. 3 depicts one embodiment of an apparatus 300 that may be used for synchronization signal/physical broadcast channel block configuration. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the transmitter 310: transmits a plurality of sets of synchronization signal/physical broadcast channel blocks within a predetermined time period, wherein each set of the plurality of sets is transmitted in a different frequency range; and transmits information indicating frequency locations corresponding to the plurality of sets of synchronization signal/physical broadcast channel blocks by explicitly indicating the frequency locations, indicating the frequency locations using common resource block index values, indicating the frequency locations using physical resource block index values, or some combination thereof.

In various embodiments, the transmitter 310: transmits first information indicating a plurality of physical random access channel resources configured for beam failure recovery; and transmits second information indicating a command for a set of the plurality of physical random access channel resources, wherein each of the plurality of physical random access channel resources is associated with a downlink reference signal of a plurality of downlink reference signals.

In certain embodiments, the transmitter 310: transmits a handover command message from a first cell, wherein: the handover command message includes first information and second information; the first information indicates a random access channel configuration of a second cell, one or more random access channel resources on the second cell, and a first one or more downlink reference signals associated with the second cell; each of the first one or more downlink reference signals is associated with a random access channel resource of the one or more random access channel resources; the second information indicates one or more random access skip configurations for handover to the second cell and a second one or more downlink reference signals associated with the second cell; and each of the second one or more downlink reference signals is associated with a random access skip configuration of the one or more random access skip configurations; and transmits a first set of downlink reference signals of the first one or more downlink reference signals and a second set of downlink reference signals of the second one or more downlink signals.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, a handover (e.g., a change of serving cell from one to another) mechanism specified to handle a UE's mobility may include a source gNB triggering handover based on a UE's measurement report and/or load conditions by sending a HO request to a target gNB, and, after receiving ACK from the target gNB, the source gNB may send a UE a HO command with a target cell configuration. In various embodiments, the UE performs a random access procedure after RRC reconfiguration (or full configuration of RRC) according to a received target cell configuration.

In certain embodiments, due to a relatively small coverage in high frequency bands (e.g., frequency bands above 6 GHz), frequent handovers may occur. Thus, reliable and efficient handover procedures which allow very short interruption time (e.g., 0 ms), a lower handover failure rate, and a fast recovery from handover failure may be used.

In some embodiments, a HO command includes one or more dedicated RACH resources. Each RACH resource may be associated with a SS/PBCH block or a CSI-RS resource. In various embodiments, a UE may select one or more dedicated RACH resources based on measurements of associated SS/PBCH blocks or CSI-RS resources (e.g., RSRP) for a contention-free random access. In such embodiments, if the UE cannot find a suitable DL beam from the SS/PBCH blocks or CSI-RS resources associated with the dedicated RACH resources, the UE may select a SS/PBCH block that does not have a dedicated preamble allocation for contention based random access. In such embodiments, the DL beam is conveyed via a SS/PBCH block or CSI-RS resource, and the DL beam is considered to be suitable if the measurement value is above a configured threshold value. As found herein, there are various enhanced mobility handling methods that take into account multi-beam based system operation.

In one embodiment, if a UE is indicated in a handover command message (e.g., via an RRC parameter 'Tach-Skip' shown in Table 1) to skip RACH and use a timing advance value of an existing TAGs for initial uplink transmission to a target cell, the UE may conditionally skip a random access procedure in the target cell during handover depending on the UE's selection of a DL beam (e.g., SS/PBCH block or CSI-RS resource).

In certain embodiments, if 'rach-Skip' (e.g., as shown in Table 1) is configured for a UE, a source gNB may omit RACH preamble indices in a dedicated RACH configuration (e.g., 'RACH-ConfigDedicated' information element shown in Table 2) of the HO command but may include an indication of SS/PBCH blocks or CSI-RS resources that convey a set of candidate DL beams that a source gNB and/or a target gNB selects for the UE. In such embodiments, if the UE selects one of the indicated SS/PBCH blocks or CSI-RS resources, the UE skips RACH and may monitor PDCCH of a target cell based on a search space configuration associated with the selected SS/PBCH block or CSI-RS resource. Moreover, in such embodiments, the search space configuration includes configurations for PDCCH monitoring occasions and a CORESET with spatial QCL information. In some embodiments, if the UE has received information about configured UL grants (e.g., configured UL grant information included in a rach-Skip' configuration), instead of PDCCH monitoring, the UE may identify the first available PUSCH occasion that is associated with the selected SS/PBCH block or CSI-RS resource and may transmit PUSCH to send a message confirming the handover. In certain embodiments, if the UE selects a SS/PBCH block different than indicated SS/PBCH blocks, the UE performs contention based RACH based on the selected SS/PBCH block.

In various embodiments, if 'rach-Skip' (e.g., as shown in Table 1) is configured for a UE, a source gNB may selectively omit RACH preamble indices in a dedicated RACH configuration (e.g., 'RACH-ConfigDedicated' information element shown in Table 2) of the HO command for some indicated SS/PBCH blocks or CSI-RS resources. In such embodiments, if the UE selects one of the indicated SS/PBCH blocks or CSI-RS resources that does not have a corresponding dedicated RACH preamble, the UE skips RACH and may monitor PDCCH of a target cell based on a search space configuration associated with the selected SS/PBCH block or CSI-RS resource. Moreover, in such embodiments, if configured UL grants are indicated (e.g., configured UL grant information included in 'rach-Skip' configuration or a part of the dedicated RACH configuration), the UE identifies the first available PUSCH occasion that is associated with the selected SS/PBCH block or CSI-RS resource and transmits PUSCH to send a message confirming the handover. In some embodiments, if the UE selects a SS/PBCH block or a CSI-RS resource different than the indicated SS/PBCH blocks or CSI-RS resources, or if the UE selects a SS/PBCH block or CSI-RS resource that has a corresponding dedicated RACH preamble, the UE performs either contention-based or contention-free RACH based on the selected SS/PBCH block. This may enable a network entity to balance between an overhead of the RACH skip mechanism involved with multiple PDCCH transmissions and/or multiple PUSCH resource reservations and a handover delay due to a RACH procedure by configuring some candidate beams with the RACH skip mechanism and other candidate beams with contention-free RACH resources. Table 2 illustrates one embodiment of a 'RACH-ConfigDedicated' information element that may be used with various embodiments described herein.

In some embodiments, instead of explicitly indicating to a UE to skip RACH using a 'rach-Skip' parameter, a source gNB may implicitly indicate to the UE to skip RACH by not including a dedicated RACH preamble index for an indicated SS/PBCH block or CSI-RS resource. Further, for the indicated SS/PBCH block or CSI-RS resource, the gNB may include an indication of a corresponding configured UL grant and/or a corresponding PDCCH search space, CORESET, and/or an indication of a TA value the UE may use for the first UL transmission if selecting the indicated SS/PBCH block or CSI-RS resource. As may be appreciated, the UE may maintain one or more UL TA values that correspond to a TA value for PCell of a MCG, a TA value for a subset of SCells of the MCG, a TA value for PCell of a SCG, and a TA value for a subset of SCells of the SCG, and so forth. In various embodiments, a gNB may indicate a different TA value for a different indicated SS/PBCH block or CSI-RS resource depending on the gNB's transmission locations for the indicated SS/PBCH block or CSI-RS resource.

TABLE 1

MobilityControlInfo Information Element

```
MobilityControlInfo ::=                         SEQUENCE {
--------Note: Other parameters of the 'MobilityControlInfo' information element not shown for
simplicity
                        makeBeforeBreak-r14             ENUMERATED {true}
                        OPTIONAL, --Need OR
                        rach-Skip-r14                   RACH-Skip-14
                        OPTIONAL, --Need OR
------------------------------------
}
RACH-Skip-r14 ::=                               SEQUENCE {
                        targetTA-r14                    CHOICE {
                        ta0-r14                                 NULL,
                        mcg-PTAG-r14                            NULL,
                        scg-PTAG-r14                            NULL,
                        mcg-STAG-r14                            STAG-Id-r11,
                        scg-STAG-r14                            STAG-Id-r11
        },
        ul-ConfigInfo-r14                               SEQUENCE {
                        numberOfConfUL-Processes-r14            INTEGER (1..8),
                        ul-SchedInterval-r14            ENUMERATED {sf2, sf5, sf10},
                        ul-StartSubframe-r14            INTEGER (0..9),
                        ul-Grant-r14                    BIT STRING (SIZE (16))
        }
                        OPTIONAL -- Need OR
}
```

TABLE 2

RACH-ConfigDedicatedInformation Element

```
-- ASN1START
-- TAG-RACH-CONFIG-DEDICATED-START
-- FFS_Standlone: resources for msg1-based on-demand SI request
RACH-ConfigDedicated ::=        SEQUENCE {
    -- Resources for contention free random access to a given target cell
    cfra-Resources                              CFRA-Resources,
    ...
}
CFRA-Resources ::=                      CHOICE {
    ssb                                                 SEQUENCE {
        ssb-ResourceList                                SEQUENCE (SIZE(1..maxRA-SSB-
Resources)) OF CFRA-SSB-Resource,
        -- Explicitly signalled PRACH Mask Index for RA Resource selection in TS
36.321. The mask is valid for all SSB
        -- resources signalled in ssb-ResourceList
        ra-ssb-OccasionMaskIndex                INTEGER (0..15)
    },
    csirs                               SEQUENCE {
        csirs-ResourceList                              SEQUENCE (SIZE(1..maxRA-
CSIRS-Resources)) OF CFRA-CSIRS-Resource,
        cfra-csirs-DedicatedRACH-Threshold              RSRP-Range
    }
}
CFRA-SSB-Resource ::=                   SEQUENCE {
    -- The ID of an SSB transmitted by this serving cell.
    ssb             SSB-Index,
    --The preamble index that the UE shall use when performing CF-RA upon selecting the
candidate beams identified by this SSB.
    ra-PreambleIndex        INTEGER (0..63),        OPTIONAL, -- Cond rach-Skip non-exists
    ...
}
CFRA-CSIRS-Resource ::=                 SEQUENCE {
    -- The ID of a CSI-RS resource defined in the measurement object associated with this
serving cell.
    csi-RS                                      CSI-RS-Index,
    -- RA occasions that the UE shall use when performing CF-RA upon selecting the
candidate beam identified by this CSI-RS.
    ra-OccasionList                 SEQUENCE (SIZE(1..maxRA-OccasionsPerCSIRS)) OF
INTEGER (0..maxRA-Occasions-1),
```

TABLE 2-continued

RACH-ConfigDedicatedInformation Element

```
    -- The RA preamble index to use in the RA occasions assoicated with this CSI-RS.
       ra-PreambleIndex      INTEGER (0..63),     OPTIONAL, -- Cond rach-Skip non-exists
       ...
}
-- TAG-RACH-CONFIG-DEDICATED-STOP
-- ASN1STOP
```

In some embodiments, 'rach-Skip non-exist' may be a field that is present in the MobilityControlInfo information element of Table 1 if the 'rach-Skip' is not configured. The 'rach-skip non-exist' may be optionally present in the MobilityControlInfo information element of Table 1, if 'rach-Skip' is configured.

Figure 4:
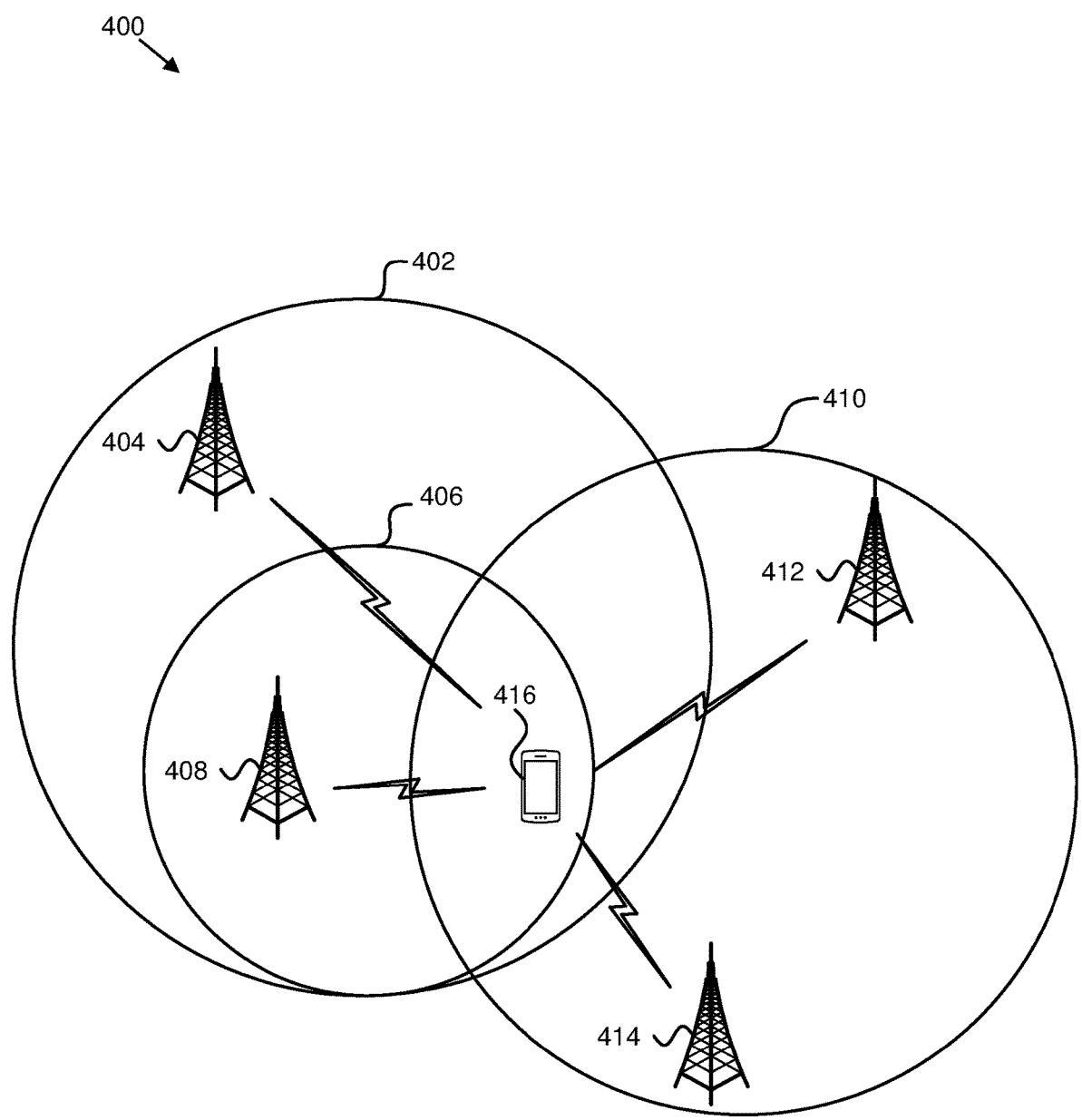
FIG. 4 is a schematic block diagram illustrating one embodiment of a system having multiple cells.

FIG. 4 is a schematic block diagram illustrating one embodiment of a system 400 having multiple cells. The system 400 includes a first cell 402 on a first carrier "f1" having a first network unit 404, a second cell 406 on a second carrier "f2" having a second network unit 408, a third cell 410 on the first carrier "f1" having a third network unit 412 and a fourth network unit 414, and a UE 416. As illustrated, the UE 416 may be connected to the first cell 402 (e.g., as PCell of MCG) and the second cell 406 (e.g., SCell of MCG) and may move toward the third cell 410. In the third cell 410, the third network unit 412 transmits SSB1 and the fourth network unit 414 transmits SSB2. The handover command configuring the third cell 410 as a target cell may include indication of SSB1 with a TA value for the first cell 402 (e.g., 'mcg-PTAG') and SSB2 with a TA value for the second cell 406 (e.g., 'mcg-STAG' with 'STAG-Id').

In certain embodiments, a radio link reconfiguration procedure (e.g., a beam recovery procedure) may handle a UE's mobility without a serving cell change. In some embodiments, a network entity may configure up to 16 dedicated PRACH resources for a UE to request BFR. In various embodiments, a UE determines whether to perform contention-free random access based on configured dedicated PRACH resources or contention based random access for BFR based on measurements of configured reference signals corresponding to configured candidate beams and measurements of SS/PBCH blocks ("SSBs").

In certain embodiments, while reserving a large number of dedicated PRACH resources (e.g., up to 64) for BFR for a UE may accommodate a UE's fast serving beam recovery, this may increase collision of PRACH preambles in a cell due to fewer preambles being available for contention-based random access and/or may increase a PRACH resource overhead due to a network entity having to configure more RACH occasions to maintain a low preamble collision rate.

In one embodiment, a UE receives an explicit or implicit indication of a large number of dedicated PRACH resources that are semi-statically configured for BFR and are associated with a large number of DL beams, and receives an activation and/or deactivation command for a subset of the semi-statically configured dedicated PRACH resources. In certain embodiments, the network entity determines the subset of the dedicated PRACH resources for activation based on UE's physical layer (e.g., Layer 1) beam measurement report and/or location information. In some embodiments, the UE receives an activation and/or deactivation command via a MAC CE. For example, a MAC CE for activating and/or deactivating 64 configured dedicated PRACH resources may include a bit map of length 64 and each bit of the bit map may be associated with each of the semi-statically configured dedicated PRACH resources with a '1' indicating activation and a '0' indicating de-activation. This mechanism may enable the network entity to adapt the candidate beams for a UE quickly if the UE is moving and/or may enable the UE to efficiently use RACH resources without increasing PRACH resource overhead in a cell.

In various embodiments, if configuring dedicated PRACH resources for BFR, a network entity may assign a given preamble of a given RACH occasion to one or more configured DL beams for a UE or to one or more DL beams of one or more UEs for efficient reuse of preambles. For example, a gNB may indicate a sequence of 'BFR-SSB-Resource' parameters and the sequence of 'BFR-SSB-Resource' parameters may indicate the following association: (SSB1, preamble 1), (SSB2, preamble2), (SSB3, preamble1), and (SSB4, preamble2). In such an example, one RACH occasion may be associated with SSB1, SSB2, SSB3, and/or SSB4. Accordingly, the network entity may coordinate activation and/or deactivation of the one or more DL beams of one or more UEs sharing a given preamble of a given RACH occasion to enable the given preamble of the given RACH occasion to be reserved and used for one beam of one UE at a time.

In certain embodiments, if a UE cannot find a suitable SS/PBCH block or CSI-RS resource within a current serving cell during a link reconfiguration procedure (e.g., beam failure recovery procedure), then the UE stops further retransmission of a PRACH preamble even though the number of preamble transmissions for BFR is smaller than a configured maximum number of transmissions and indicates a RACH problem to a higher layer (e.g., RRC). In such embodiments, upon receiving the RACH problem indication, the higher layer starts an RRC connection reestablishment procedure. In one example, the UE indicates the RACH problem to RRC if measurement values of all SS/PBCH blocks for the cell are below a configured RSRP threshold and the UE is in a power limited condition (e.g., cannot meet the required transmit power even with the maximum configured transmit power), and/or the UE cannot detect any SS/PBCH blocks of the cell.

In some embodiments, a gNB configures a UE with dedicated PRACH resources of neighbor cells in addition to PRACH resources of a serving cell for BFR and the gNB may activate and/or deactivate the dedicated PRACH resources of the neighbor cells depending on the UE's measurement report. In such embodiments, if a MAC CE activates a part or all of the dedicated PRACH resources of the neighbor cells or after the dedicated PRACH resources of the neighbor cells are configured for the UE, handover preparation between two gNBs may start (e.g., a source gNB triggers handover by sending HO request to a target gNB and the target gNB has the relevant UE context information). In certain embodiments, if a UE cannot find a suitable SS/PBCH block or CSI-RS resource within a current serving cell during a link reconfiguration procedure, the UE may indicate the RACH problem (even without reaching a maximum number of preamble transmissions) to RRC and the RRC initiates a RRC connection reestablishment procedure with one of the prepared neighbor cells for which the UE has the configured dedicated PRACH resources and the minimum configuration information for the target cell.

In various embodiments, for operation in an unpaired spectrum (e.g., TDD), a UE may not be expected to receive a configuration in which a center frequency for a DL BWP is different than a center frequency for a UL BWP if a DL-BWP-index of the DL BWP is equal to a UL-BWP-index of the UL BWP. In such embodiments, if the UE switches an active DL (or UL) BWP upon receiving a DL assignment (or a UL grant) with a BWP switching indication via a DCI format 1_1 (or a DCI format 0_1), the UE may assume that a corresponding UL (or DL) BWP with the same BWP index is also set to be an active UL (or DL) BWP.

In certain embodiments, if a network entity configures a UE with one or more DL (or UL) BWPs that have the same center frequency but have the same or different bandwidths, potentially with different DL (or UL) configurations, the network entity may indicate to the UE to switch from a first DL (or UL) BWP to a second DL (or UL) BWP for the active DL (or UL) BWP without the UE changing the active UL (or DL) BWP. In some embodiments, the first and second DL (or UL) BWPs and the active UL (or DL) BWP share the same center frequency. In various embodiments, different DL (or UL) configurations for different DL (or UL) BWPs may include different configurations for at least one of PDCCH, an SS/PBCH block, a CSI-RS resource, PUCCH, RACH, PUSCH, and a configured UL grant.

In one embodiment, if a UE changes a center frequency of an active UL (or DL) BWP, the UE switches an active DL (or UL) BWP in response to the change of the active UL (or DL) BWP. In such an embodiment, the resulting active UL and DL BWPs have the same BWP index. If the UE does not change the center frequency of the active UL (or DL) BWP, the UE's active DL (or UL) BWP remains the same until receiving an indication of DL (or UL) BWP switching or an indication of change of the center frequency of the active UL (or DL) BWP. This may enable the network entity to indicate to the UE to operate from one DL (or UL) BWP configuration to another DL (or UL) BWP configuration without triggering unnecessary BWP switching for UL (or DL).

In various embodiments, for UE-specifically configured initial active DL and/or UL BWPs, first active DL and/or UL BWPs, and default DL and/or UL BWPs, a BWP index for a given DL BWP and a corresponding UL BWP may be different. However, in an unpaired spectrum, the network entity may enable UE-specifically configured initial active DL and/or UL BWPs, the first active DL and/or UL BWPs, and the default DL and/or UL BWPs to have center frequencies in common with paired UL and DL BWPs.

In some embodiments, in a cell with a wideband carrier, a network entity may transmit more than one set of SS/PBCH blocks (e.g., more than one SS burst sets) within a given time window (e.g., 5 ms duration). In such embodiments, each set of SS/PBCH blocks is transmitted in different frequency locations. In some embodiments, an SS/PBCH block index (e.g., the parameter 'SSB-Index') is an integer value between 0 and 63 to refer to up to 64 SS/PBCH blocks within an SS burst set. In such embodiments, the SS/PBCH block index may be used for various scenarios such as for an indication of pathloss RS, RLM RS, and configuration of contention-free random access resources.

In various embodiments, in a handover command (e.g., 'MobilityControlInfo' information element) or for an addition or a reconfiguration of a SpCell (e.g., a PCell or a SPCell) or SCell, the network entity may indicate additional frequency locations in which SS/PBCH blocks are transmitted based on an absolute frequency location (e.g., with the parameter ARFCN-ValueNR), a CRB index within a cell and/or a subcarrier index within the indicated CRB, or a PRB index within a configured BWP and/or a subcarrier index within the indicated PRB.

In one embodiment, a UE may determine indexing of SS/PBCH blocks of more than one SS burst sets in different frequency locations within an SS burst set transmission window (e.g., 5 ms) based on a predetermined rule and signaled frequency locations of SS/PBCH blocks. In one example, an SS burst set may be indexed in an ascending (or descending) order of frequency locations, SS/PBCH blocks may be indexed in time first within a given SS burst set, and an SS/PBCH block index may increase with the index of SS burst sets in frequency. For example, the SS/PBCH blocks transmitted on the lowest frequency location are indexed first from 0 to 63, and the SS/PBCH blocks transmitted on the next lowest frequency location are indexed from 64 to 127. In another example, an SS burst set is indexed according to the order (or index) of indicated frequency locations, SS/PBCH blocks are indexed in time first within a given SS burst set, and the SS/PBCH block index increases with the index of SS burst sets in frequency.

In some embodiments, a highest number (e.g., N−1) for a SS/PBCH block index may be determined based on a maximum allowed number of SS burst sets ("K") within a 5 ms time window for one cell and a maximum allowed number of SS/PBCH blocks (e.g., 64) within an SS burst set, such as N=K·64.

TABLE 3

| SSB-Index Information Element |
| --- |
| -- ASN1START |
| -- TAG-SSB-INDEX-START |
| SSB-Index ::=     INTEGER (0..63 64 .. 127 .. N−1) |
| -- TAG-SSB-INDEX-STOP |
| -- ASN1STOP |

Figure 5:
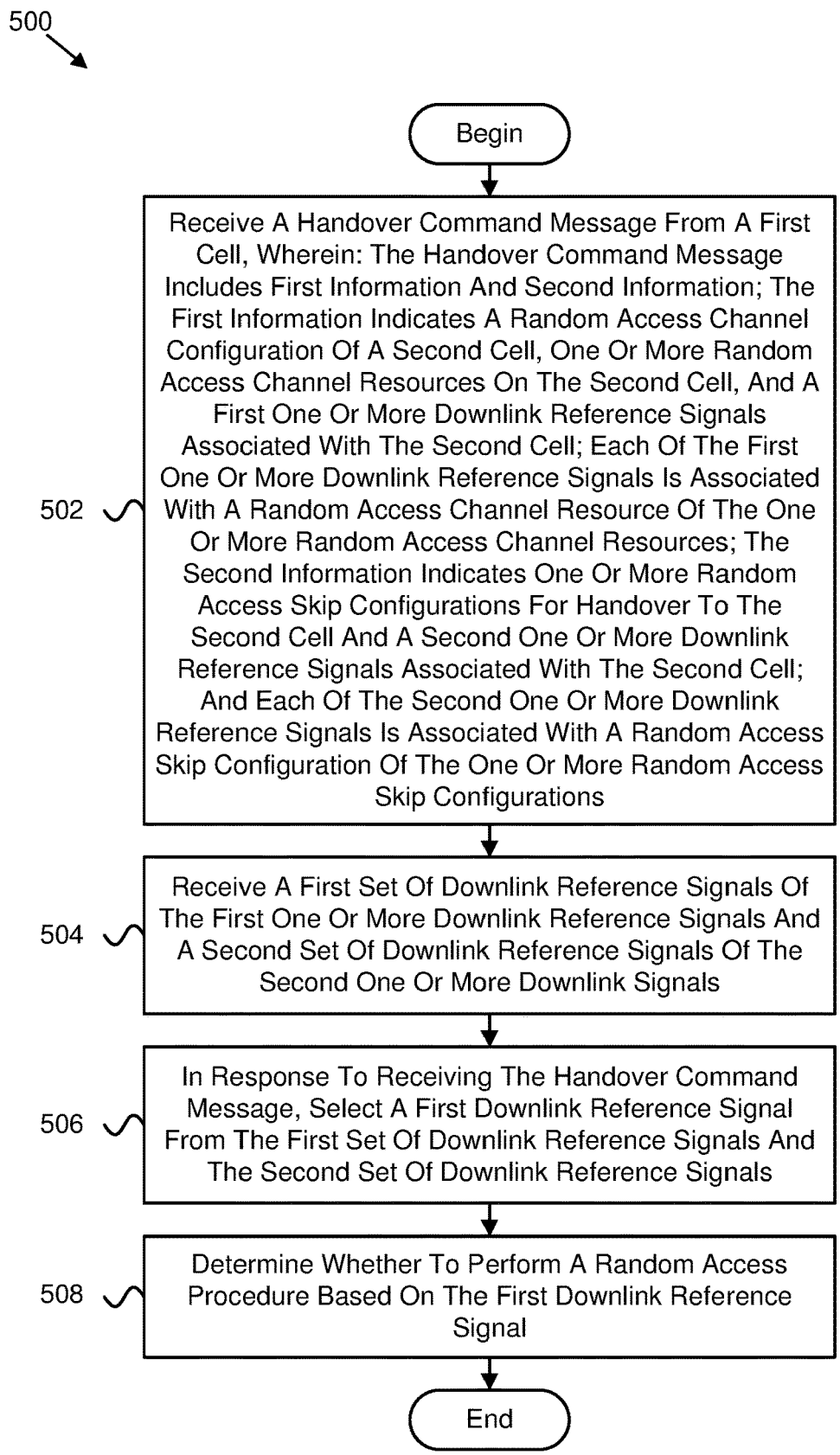
FIG. 5 is a flow chart diagram illustrating one embodiment of a method for random access skip configuration.

FIG. 5 is a flow chart diagram illustrating one embodiment of a method 500 for random access skip configuration. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

The method 500 may include receiving 502 a handover command message from a first cell, wherein: the handover command message includes first information and second information; the first information indicates a random access channel configuration of a second cell, one or more random access channel resources on the second cell, and a first one or more downlink reference signals associated with the second cell; each of the first one or more downlink reference signals is associated with a random access channel resource of the one or more random access channel resources; the second information indicates one or more random access skip configurations for handover to the second cell and a second one or more downlink reference signals associated with the second cell; and each of the second one or more downlink reference signals is associated with a random access skip configuration of the one or more random access skip configurations. In certain embodiments, the method 500 includes receiving 504 a first set of downlink reference signals of the first one or more downlink reference signals and a second set of downlink reference signals of the second one or more downlink signals. In various embodiments, the method 500 includes, in response to receiving the handover command message, selecting 506 a first downlink reference signal from the first set of downlink reference signals and the second set of downlink reference signals. In some embodiments, the method 500 includes determining 508 whether to perform a random access procedure based on the first downlink reference signal.

In certain embodiments, each of the first and second sets of downlink reference signals comprises a synchronization signal/physical broadcast channel block, a channel state information reference signal, or a combination thereof. In some embodiments, the first downlink reference signal is selected from the first set of downlink reference signals, and the method further comprises performing the random access procedure by transmitting a random access channel preamble on a random access channel occasion of a random access channel resource associated with the first downlink reference signal. In various embodiments, the random access channel resource includes a dedicated random access channel preamble, and performing the random access procedure further comprises performing a contention-free random access procedure by transmitting the dedicated random access channel preamble.

In one embodiment, the first downlink reference signal is selected from the second set of downlink reference signals, and the method further comprises skipping the random access procedure according to a first random access skip configuration associated with the first downlink reference signal. In certain embodiments, the random access skip configuration of the one or more random access skip configurations indicates configuration information for a control resource set and a search space associated with a downlink reference signal, and the method further comprises monitoring physical downlink control channel candidates on resources of the control resource set based on the search space. In some embodiments, the random access skip configuration of the one or more random access skip configurations indicates configuration information for a configured uplink grant associated with a downlink reference signal, and the method further comprises transmitting a message on a physical uplink shared channel occasion associated with the configured uplink grant.

In various embodiments, the message comprises information confirming a successful handover completion. In one embodiment, the random access skip configuration of the one or more random access skip configurations includes an indication of a reference timing advance value to be used if transmitting to the second cell. In certain embodiments, the reference timing advance value comprises a zero value, a timing advance value for a primary cell of a master cell group, a timing advance value for one or more secondary cells of the master cell group, a timing advance value for a primary secondary cell of a secondary cell group, or a timing advance value for one or more secondary cells of the secondary cell group.

In some embodiments, the method 500 further comprises: receiving a third set of downlink reference signals associated with the second cell, wherein each of the third set of downlink reference signals is absent from the first one or more downlink reference signals and the second one or more downlink reference signals; selecting a second downlink reference signal, wherein the second downlink reference signal is included in the third set of downlink reference signals; determining a random access channel resource associated with the second downlink reference signal according to the random access channel configuration; and performing a contention-based random access procedure by transmitting a randomly selected random access channel preamble on a random access channel occasion of the random access channel resource.

In various embodiments, the second downlink reference signal comprises a synchronization signal/physical broadcast channel block or a channel state information reference signal. In one embodiment, selecting the first downlink reference signal from the first set of downlink reference signals and the second set of downlink reference signals comprises selecting the first downlink reference signal from the first set of downlink reference signals and the second set of downlink reference signals based on a downlink reference signal quality compared to a threshold signal quality. In certain embodiments, the threshold signal quality comprises a first signal quality threshold for the first set of downlink reference signals and a second signal quality threshold for the second set of downlink reference signals, and the first signal quality threshold is different from the second signal quality threshold.

Figure 6:
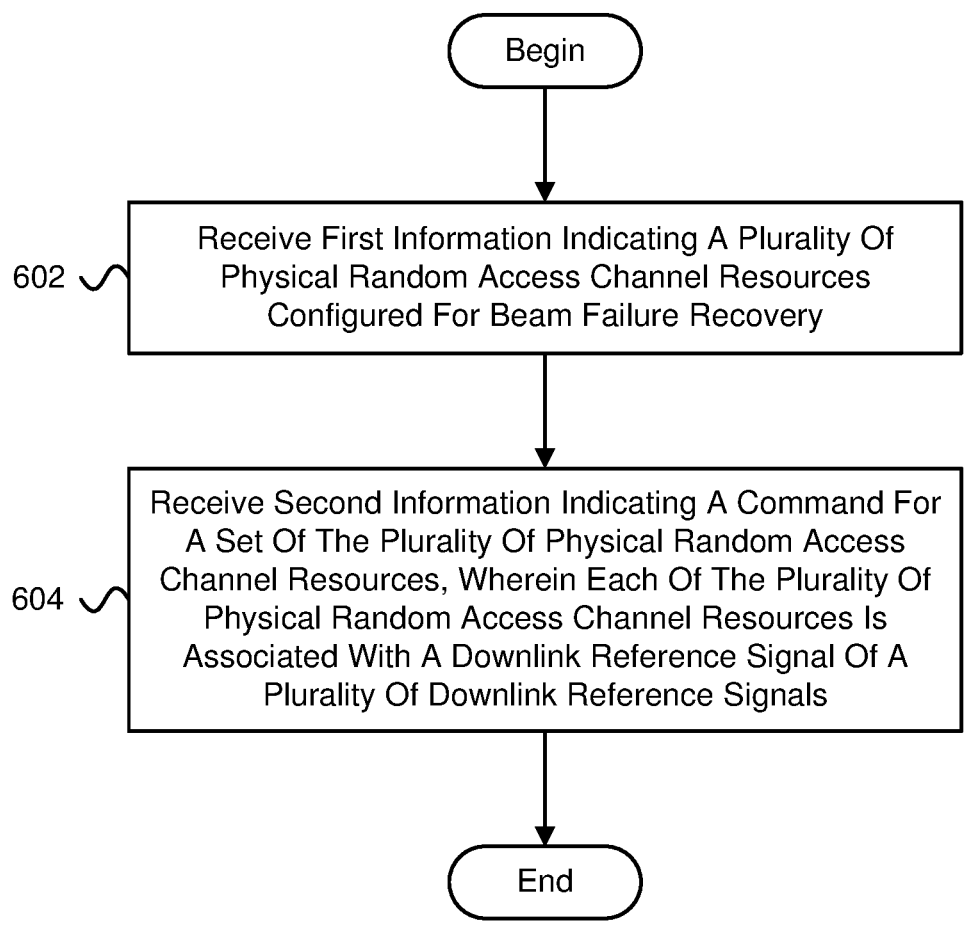
FIG. 6 is a flow chart diagram illustrating one embodiment of a method for beam failure recovery.

FIG. 6 is a flow chart diagram illustrating one embodiment of a method 600 for beam failure recovery. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include receiving 602 first information indicating a plurality of physical random access channel resources configured for beam failure recovery. In some embodiments, the method 600 includes receiving 604 second information indicating a command for a set of the plurality of physical random access channel resources, wherein each of the plurality of physical random access channel resources is associated with a downlink reference signal of a plurality of downlink reference signals.

In certain embodiments, the command comprises an activation command, a deactivation command, or a combination thereof. In some embodiments, the second information indicating the command for the set of the plurality of physical random access channel resources comprises a command for each physical random access channel resource of the set of the plurality of physical random access channel resources. In various embodiments, the set of the plurality of physical random access channel resources is determined based on a beam measurement report based on the plurality of downlink reference signals, location information, or a combination thereof.

In one embodiment, receiving the second information indicating the command for the set of the plurality of physical random access channel resources comprises receiving the second information via a medium access control control element. In certain embodiments, the second information comprises a bitmap, and each bit of the bitmap indicates the command for a physical random access channel resource of the set of the plurality of physical random access channel resources. In some embodiments, the method 600 further comprises receiving third information indicating configuration information for the plurality of physical random access channel resources.

In various embodiments, the method 600 further comprises determining whether there is a suitable physical random access channel resource of the plurality of physical random access channel resources. In one embodiment, the method 600 further comprises, in response to not finding a suitable physical random access channel resource of the plurality of physical random access channel resources, inhibiting further retransmission of a physical random access channel preamble and indicating a random access channel problem. In certain embodiments, the method 600 further comprises, in response to indicating the random access channel problem, initiating a radio resource control connection reestablishment procedure.

In some embodiments, the random access channel problem is indicated to radio resource control in response to measurement values for synchronization signal/physical broadcast channel blocks for a cell being below a predetermined threshold, a status indicating a power limited condition, an inability to detect the synchronization signal/physical broadcast channel blocks for the cell, or some combination thereof. In various embodiments, the plurality of physical random access channel resources configured for beam failure recovery comprises physical random access channel resources for a serving cell, a neighboring cell, or a combination thereof.

Figure 7:
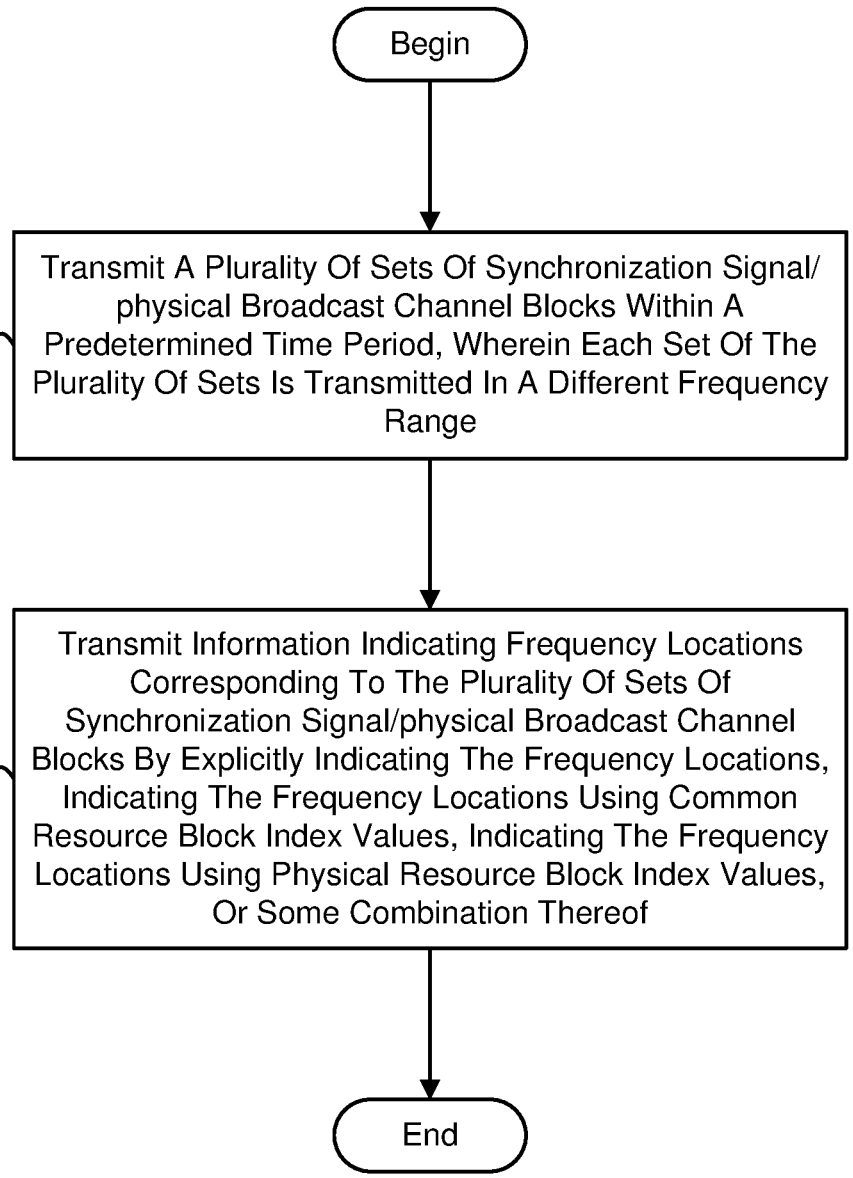
FIG. 7 is a flow chart diagram illustrating one embodiment of a method for synchronization signal/physical broadcast channel block configuration.

FIG. 7 is a flow chart diagram illustrating one embodiment of a method 700 for synchronization signal/physical broadcast channel block configuration. In some embodiments, the method 700 is performed by an apparatus, such as the network unit 104. In certain embodiments, the method 700 may be performed by a processor executing program code, for example, a microcontroller, a microprocessor, a CPU, a GPU, an auxiliary processing unit, a FPGA, or the like.

The method 700 may include transmitting 702 a plurality of sets of synchronization signal/physical broadcast channel blocks within a predetermined time period, wherein each set of the plurality of sets is transmitted in a different frequency range. In certain embodiments, the method 700 comprises transmitting 704 information indicating frequency locations corresponding to the plurality of sets of synchronization signal/physical broadcast channel blocks by explicitly indicating the frequency locations, indicating the frequency locations using common resource block index values, indicating the frequency locations using physical resource block index values, or some combination thereof.

In certain embodiments, the information is transmitted in a handover command. In some embodiments, the information is transmitted in a reconfiguration message. In various embodiments, an index of a synchronization signal/physical broadcast channel block of the plurality of sets of synchronization signal/physical broadcast channel blocks within the predetermined time period is determined based on a predetermined rule and the frequency locations. In one embodiment, the predetermined rule comprises an ascending order of the frequency locations or a descending order of the frequency locations.

In one embodiment, a method comprises: receiving a handover command message from a first cell, wherein: the handover command message includes first information and second information; the first information indicates a random access channel configuration of a second cell, one or more random access channel resources on the second cell, and a first one or more downlink reference signals associated with the second cell; each of the first one or more downlink reference signals is associated with a random access channel resource of the one or more random access channel resources; the second information indicates one or more random access skip configurations for handover to the second cell and a second one or more downlink reference signals associated with the second cell; and each of the second one or more downlink reference signals is associated with a random access skip configuration of the one or more random access skip configurations; receiving a first set of downlink reference signals of the first one or more downlink reference signals and a second set of downlink reference signals of the second one or more downlink signals; in response to receiving the handover command message, selecting a first downlink reference signal from the first set of downlink reference signals and the second set of downlink reference signals; and determining whether to perform a random access procedure based on the first downlink reference signal.

In certain embodiments, each of the first and second sets of downlink reference signals comprises a synchronization signal/physical broadcast channel block, a channel state information reference signal, or a combination thereof.

In some embodiments, the first downlink reference signal is selected from the first set of downlink reference signals, and the method further comprises performing the random access procedure by transmitting a random access channel preamble on a random access channel occasion of a random access channel resource associated with the first downlink reference signal.

In various embodiments, the random access channel resource includes a dedicated random access channel preamble, and performing the random access procedure further comprises performing a contention-free random access procedure by transmitting the dedicated random access channel preamble.

In one embodiment, the first downlink reference signal is selected from the second set of downlink reference signals, and the method further comprises skipping the random access procedure according to a first random access skip configuration associated with the first downlink reference signal.

In certain embodiments, the random access skip configuration of the one or more random access skip configurations indicates configuration information for a control resource set and a search space associated with a downlink reference signal, and the method further comprises monitoring physical downlink control channel candidates on resources of the control resource set based on the search space.

In some embodiments, the random access skip configuration of the one or more random access skip configurations indicates configuration information for a configured uplink grant associated with a downlink reference signal, and the method further comprises transmitting a message on a physical uplink shared channel occasion associated with the configured uplink grant.

In various embodiments, the message comprises information confirming a successful handover completion.

In one embodiment, the random access skip configuration of the one or more random access skip configurations includes an indication of a reference timing advance value to be used if transmitting to the second cell.

In certain embodiments, the reference timing advance value comprises a zero value, a timing advance value for a primary cell of a master cell group, a timing advance value for one or more secondary cells of the master cell group, a timing advance value for a primary secondary cell of a secondary cell group, or a timing advance value for one or more secondary cells of the secondary cell group.

In some embodiments, the method further comprises: receiving a third set of downlink reference signals associated with the second cell, wherein each of the third set of downlink reference signals is absent from the first one or more downlink reference signals and the second one or more downlink reference signals; selecting a second downlink reference signal, wherein the second downlink reference signal is included in the third set of downlink reference signals; determining a random access channel resource associated with the second downlink reference signal according to the random access channel configuration; and performing a contention-based random access procedure by transmitting a randomly selected random access channel preamble on a random access channel occasion of the random access channel resource.

In various embodiments, the second downlink reference signal comprises a synchronization signal/physical broadcast channel block or a channel state information reference signal.

In one embodiment, selecting the first downlink reference signal from the first set of downlink reference signals and the second set of downlink reference signals comprises selecting the first downlink reference signal from the first set of downlink reference signals and the second set of downlink reference signals based on a downlink reference signal quality compared to a threshold signal quality.

In certain embodiments, the threshold signal quality comprises a first signal quality threshold for the first set of downlink reference signals and a second signal quality threshold for the second set of downlink reference signals, and the first signal quality threshold is different from the second signal quality threshold.

In one embodiment, an apparatus comprises: a receiver that: receives a handover command message from a first cell, wherein: the handover command message includes first information and second information; the first information indicates a random access channel configuration of a second cell, one or more random access channel resources on the second cell, and a first one or more downlink reference signals associated with the second cell; each of the first one or more downlink reference signals is associated with a random access channel resource of the one or more random access channel resources; the second information indicates one or more random access skip configurations for handover to the second cell and a second one or more downlink reference signals associated with the second cell; and each of the second one or more downlink reference signals is associated with a random access skip configuration of the one or more random access skip configurations; and receives a first set of downlink reference signals of the first one or more downlink reference signals and a second set of downlink reference signals of the second one or more downlink signals; and a processor that: in response to receiving the handover command message, selects a first downlink reference signal from the first set of downlink reference signals and the second set of downlink reference signals; and determines whether to perform a random access procedure based on the first downlink reference signal.

In certain embodiments, each of the first and second sets of downlink reference signals comprises a synchronization signal/physical broadcast channel block, a channel state information reference signal, or a combination thereof.

In some embodiments, the first downlink reference signal is selected from the first set of downlink reference signals, and the processor performs the random access procedure by transmitting a random access channel preamble on a random access channel occasion of a random access channel resource associated with the first downlink reference signal.

In various embodiments, the random access channel resource includes a dedicated random access channel preamble, and the processor performs the random access procedure by performing a contention-free random access procedure by transmitting the dedicated random access channel preamble.

In one embodiment, the first downlink reference signal is selected from the second set of downlink reference signals, and the processor skips the random access procedure according to a first random access skip configuration associated with the first downlink reference signal.

In certain embodiments, the random access skip configuration of the one or more random access skip configurations indicates configuration information for a control resource set and a search space associated with a downlink reference signal, and the processor monitors physical downlink control channel candidates on resources of the control resource set based on the search space.

In some embodiments, the apparatus further comprises a transmitter, wherein the random access skip configuration of the one or more random access skip configurations indicates configuration information for a configured uplink grant associated with a downlink reference signal, and the transmitter transmits a message on a physical uplink shared channel occasion associated with the configured uplink grant.

In various embodiments, the message comprises information confirming a successful handover completion.

In one embodiment, the random access skip configuration of the one or more random access skip configurations includes an indication of a reference timing advance value to be used if transmitting to the second cell.

In certain embodiments, the reference timing advance value comprises a zero value, a timing advance value for a primary cell of a master cell group, a timing advance value for one or more secondary cells of the master cell group, a timing advance value for a primary secondary cell of a secondary cell group, or a timing advance value for one or more secondary cells of the secondary cell group.

In some embodiments: the receiver receives a third set of downlink reference signals associated with the second cell, and each of the third set of downlink reference signals is absent from the first one or more downlink reference signals and the second one or more downlink reference signals; and the processor: selects a second downlink reference signal, wherein the second downlink reference signal is included in the third set of downlink reference signals; determines a random access channel resource associated with the second downlink reference signal according to the random access channel configuration; and performs a contention-based random access procedure by transmitting a randomly selected random access channel preamble on a random access channel occasion of the random access channel resource.

In various embodiments, the second downlink reference signal comprises a synchronization signal/physical broadcast channel block or a channel state information reference signal.

In one embodiment, the processor selecting the first downlink reference signal from the first set of downlink reference signals and the second set of downlink reference signals comprises the processor selecting the first downlink reference signal from the first set of downlink reference signals and the second set of downlink reference signals based on a downlink reference signal quality compared to a threshold signal quality.

In certain embodiments, the threshold signal quality comprises a first signal quality threshold for the first set of downlink reference signals and a second signal quality threshold for the second set of downlink reference signals, and the first signal quality threshold is different from the second signal quality threshold.

In one embodiment, a method comprises: transmitting a handover command message from a first cell, wherein: the handover command message includes first information and second information; the first information indicates a random access channel configuration of a second cell, one or more random access channel resources on the second cell, and a first one or more downlink reference signals associated with the second cell; each of the first one or more downlink reference signals is associated with a random access channel resource of the one or more random access channel resources; the second information indicates one or more random access skip configurations for handover to the second cell and a second one or more downlink reference signals associated with the second cell; and each of the second one or more downlink reference signals is associated with a random access skip configuration of the one or more random access skip configurations; and transmitting a first set of downlink reference signals of the first one or more downlink reference signals and a second set of downlink reference signals of the second one or more downlink signals.

In certain embodiments, each of the first and second sets of downlink reference signals comprises a synchronization signal/physical broadcast channel block, a channel state information reference signal, or a combination thereof.

In one embodiment, the random access skip configuration of the one or more random access skip configurations includes an indication of a reference timing advance value to be used if transmitting to the second cell.

In certain embodiments, the reference timing advance value comprises a zero value, a timing advance value for a primary cell of a master cell group, a timing advance value for one or more secondary cells of the master cell group, a timing advance value for a primary secondary cell of a secondary cell group, or a timing advance value for one or more secondary cells of the secondary cell group.

In some embodiments, the method further comprises: transmitting a third set of downlink reference signals associated with the second cell, wherein each of the third set of downlink reference signals is absent from the first one or more downlink reference signals and the second one or more downlink reference signals.

In one embodiment, an apparatus comprises: a transmitter that: transmits a handover command message from a first cell, wherein: the handover command message includes first information and second information; the first information indicates a random access channel configuration of a second cell, one or more random access channel resources on the second cell, and a first one or more downlink reference signals associated with the second cell; each of the first one or more downlink reference signals is associated with a random access channel resource of the one or more random access channel resources; the second information indicates one or more random access skip configurations for handover to the second cell and a second one or more downlink reference signals associated with the second cell; and each of the second one or more downlink reference signals is associated with a random access skip configuration of the one or more random access skip configurations; and transmits a first set of downlink reference signals of the first one or more downlink reference signals and a second set of downlink reference signals of the second one or more downlink signals.

In certain embodiments, each of the first and second sets of downlink reference signals comprises a synchronization signal/physical broadcast channel block, a channel state information reference signal, or a combination thereof.

In one embodiment, the random access skip configuration of the one or more random access skip configurations includes an indication of a reference timing advance value to be used if transmitting to the second cell.

In certain embodiments, the reference timing advance value comprises a zero value, a timing advance value for a primary cell of a master cell group, a timing advance value for one or more secondary cells of the master cell group, a timing advance value for a primary secondary cell of a secondary cell group, or a timing advance value for one or more secondary cells of the secondary cell group.

In some embodiments, the transmitter transmits a third set of downlink reference signals associated with the second cell, wherein each of the third set of downlink reference signals is absent from the first one or more downlink reference signals and the second one or more downlink reference signals.

In one embodiment, a method comprises: receiving first information indicating a plurality of physical random access channel resources configured for beam failure recovery; and receiving second information indicating a command for a set of the plurality of physical random access channel resources, wherein each of the plurality of physical random access channel resources is associated with a downlink reference signal of a plurality of downlink reference signals.

In certain embodiments, the command comprises an activation command, a deactivation command, or a combination thereof.

In some embodiments, the second information indicating the command for the set of the plurality of physical random access channel resources comprises a command for each physical random access channel resource of the set of the plurality of physical random access channel resources.

In various embodiments, the set of the plurality of physical random access channel resources is determined based on a beam measurement report based on the plurality of downlink reference signals, location information, or a combination thereof.

In one embodiment, receiving the second information indicating the command for the set of the plurality of physical random access channel resources comprises receiving the second information via a medium access control control element.

In certain embodiments, the second information comprises a bitmap, and each bit of the bitmap indicates the command for a physical random access channel resource of the set of the plurality of physical random access channel resources.

In some embodiments, the method further comprises receiving third information indicating configuration information for the plurality of physical random access channel resources.

In various embodiments, the method further comprises determining whether there is a suitable physical random access channel resource of the plurality of physical random access channel resources.

In one embodiment, the method further comprises, in response to not finding a suitable physical random access channel resource of the plurality of physical random access channel resources, inhibiting further retransmission of a physical random access channel preamble and indicating a random access channel problem.

In certain embodiments, the method further comprises, in response to indicating the random access channel problem, initiating a radio resource control connection reestablishment procedure.

In some embodiments, the random access channel problem is indicated to radio resource control in response to measurement values for synchronization signal/physical broadcast channel blocks for a cell being below a predetermined threshold, a status indicating a power limited condition, an inability to detect the synchronization signal/physical broadcast channel blocks for the cell, or some combination thereof.

In various embodiments, the plurality of physical random access channel resources configured for beam failure recovery comprises physical random access channel resources for a serving cell, a neighboring cell, or a combination thereof.

In one embodiment, an apparatus comprises: a receiver that: receives first information indicating a plurality of physical random access channel resources configured for beam failure recovery; and receives second information indicating a command for a set of the plurality of physical random access channel resources, wherein each of the plurality of physical random access channel resources is associated with a downlink reference signal of a plurality of downlink reference signals.

In certain embodiments, the command comprises an activation command, a deactivation command, or a combination thereof.

In some embodiments, the second information indicating the command for the set of the plurality of physical random access channel resources comprises a command for each physical random access channel resource of the set of the plurality of physical random access channel resources.

In various embodiments, the set of the plurality of physical random access channel resources is determined based on a beam measurement report based on the plurality of downlink reference signals, location information, or a combination thereof.

In one embodiment, the receiver receiving the second information indicating the command for the set of the plurality of physical random access channel resources comprises the receiver receiving the second information via a medium access control control element.

In certain embodiments, the second information comprises a bitmap, and each bit of the bitmap indicates the command for a physical random access channel resource of the set of the plurality of physical random access channel resources.

In some embodiments, the receiver receives third information indicating configuration information for the plurality of physical random access channel resources.

In various embodiments, the apparatus further comprises a processor that determines whether there is a suitable physical random access channel resource of the plurality of physical random access channel resources.

In one embodiment, the processor, in response to not finding a suitable physical random access channel resource of the plurality of physical random access channel resources, inhibits further retransmission of a physical random access channel preamble and indicates a random access channel problem.

In certain embodiments, the processor, in response to indicating the random access channel problem, indicates a radio resource control connection reestablishment procedure.

In some embodiments, the random access channel problem is indicated to radio resource control in response to measurement values for synchronization signal/physical broadcast channel blocks for a cell being below a predetermined threshold, a status indicating a power limited condition, an inability to detect the synchronization signal/physical broadcast channel blocks for the cell, or some combination thereof.

In various embodiments, the plurality of physical random access channel resources configured for beam failure recovery comprises physical random access channel resources for a serving cell, a neighboring cell, or a combination thereof.

In one embodiment, a method comprises: transmitting first information indicating a plurality of physical random access channel resources configured for beam failure recovery; and transmitting second information indicating a command for a set of the plurality of physical random access channel resources, wherein each of the plurality of physical random access channel resources is associated with a downlink reference signal of a plurality of downlink reference signals.

In certain embodiments, the command comprises an activation command, a deactivation command, or a combination thereof.

In some embodiments, the second information indicating the command for the set of the plurality of physical random access channel resources comprises a command for each physical random access channel resource of the set of the plurality of physical random access channel resources.

In various embodiments, the set of the plurality of physical random access channel resources is determined based on a beam measurement report based on the plurality of downlink reference signals, location information, or a combination thereof.

In one embodiment, transmitting the second information indicating the command for the set of the plurality of physical random access channel resources comprises transmitting the second information via a medium access control control element.

In certain embodiments, the second information comprises a bitmap, and each bit of the bitmap indicates the command for a physical random access channel resource of the set of the plurality of physical random access channel resources.

In some embodiments, the method further comprises transmitting third information indicating configuration information for the plurality of physical random access channel resources.

In various embodiments, the plurality of physical random access channel resources configured for beam failure recovery comprises physical random access channel resources for a serving cell, a neighboring cell, or a combination thereof.

In one embodiment, an apparatus comprises: a transmitter that: transmits first information indicating a plurality of physical random access channel resources configured for beam failure recovery; and transmits second information indicating a command for a set of the plurality of physical random access channel resources, wherein each of the plurality of physical random access channel resources is associated with a downlink reference signal of a plurality of downlink reference signals.

In certain embodiments, the command comprises an activation command, a deactivation command, or a combination thereof.

In some embodiments, the second information indicating the command for the set of the plurality of physical random access channel resources comprises a command for each physical random access channel resource of the set of the plurality of physical random access channel resources.

In various embodiments, the set of the plurality of physical random access channel resources is determined based on a beam measurement report based on the plurality of downlink reference signals, location information, or a combination thereof.

In one embodiment, the transmitter transmits the second information indicating the command for the set of the plurality of physical random access channel resources by transmitting the second information via a medium access control control element.

In certain embodiments, the second information comprises a bitmap, and each bit of the bitmap indicates the command for a physical random access channel resource of the set of the plurality of physical random access channel resources.

In some embodiments, the transmitter transmits third information indicating configuration information for the plurality of physical random access channel resources.

In various embodiments, the plurality of physical random access channel resources configured for beam failure recovery comprises physical random access channel resources for a serving cell, a neighboring cell, or a combination thereof.

In one embodiment, a method comprises: transmitting a plurality of sets of synchronization signal/physical broadcast channel blocks within a predetermined time period, wherein each set of the plurality of sets is transmitted in a different frequency range; and transmitting information indicating frequency locations corresponding to the plurality of sets of synchronization signal/physical broadcast channel blocks by explicitly indicating the frequency locations, indicating the frequency locations using common resource block index values, indicating the frequency locations using physical resource block index values, or some combination thereof.

In certain embodiments, the information is transmitted in a handover command.

In some embodiments, the information is transmitted in a reconfiguration message.

In various embodiments, an index of a synchronization signal/physical broadcast channel block of the plurality of sets of synchronization signal/physical broadcast channel blocks within the predetermined time period is determined based on a predetermined rule and the frequency locations.

In one embodiment, the predetermined rule comprises an ascending order of the frequency locations or a descending order of the frequency locations.

In one embodiment, an apparatus comprises: a transmitter that: transmits a plurality of sets of synchronization signal/physical broadcast channel blocks within a predetermined time period, wherein each set of the plurality of sets is transmitted in a different frequency range; and transmits information indicating frequency locations corresponding to the plurality of sets of synchronization signal/physical broadcast channel blocks by explicitly indicating the frequency locations, indicating the frequency locations using common resource block index values, indicating the frequency locations using physical resource block index values, or some combination thereof.

In certain embodiments, the information is transmitted in a handover command.

In some embodiments, the information is transmitted in a reconfiguration message.

In various embodiments, an index of a synchronization signal/physical broadcast channel block of the plurality of sets of synchronization signal/physical broadcast channel blocks within the predetermined time period is determined based on a predetermined rule and the frequency locations.

In one embodiment, the predetermined rule comprises an ascending order of the frequency locations or a descending order of the frequency locations.

In one embodiment, a method comprises: receiving a plurality of sets of synchronization signal/physical broadcast channel blocks within a predetermined time period, wherein each set of the plurality of sets is transmitted in a different frequency range; and receiving information indicating frequency locations corresponding to the plurality of sets of synchronization signal/physical broadcast channel blocks by explicitly indicating the frequency locations, indicating the frequency locations using common resource block index values, indicating the frequency locations using physical resource block index values, or some combination thereof.

In certain embodiments, the information is received in a handover command.

In some embodiments, the information is received in a reconfiguration message.

In various embodiments, an index of a synchronization signal/physical broadcast channel block of the plurality of sets of synchronization signal/physical broadcast channel blocks within the predetermined time period is determined based on a predetermined rule and the frequency locations.

In one embodiment, the predetermined rule comprises an ascending order of the frequency locations or a descending order of the frequency locations.

In one embodiment, an apparatus comprises: a receiver that: receives a plurality of sets of synchronization signal/physical broadcast channel blocks within a predetermined time period, wherein each set of the plurality of sets is transmitted in a different frequency range; and receives information indicating frequency locations corresponding to the plurality of sets of synchronization signal/physical broadcast channel blocks by explicitly indicating the frequency locations, indicating the frequency locations using common resource block index values, indicating the frequency locations using physical resource block index values, or some combination thereof.

In certain embodiments, the information is received in a handover command.

In some embodiments, the information is received in a reconfiguration message.

In various embodiments, an index of a synchronization signal/physical broadcast channel block of the plurality of sets of synchronization signal/physical broadcast channel blocks within the predetermined time period is determined based on a predetermined rule and the frequency locations.

In one embodiment, the predetermined rule comprises an ascending order of the frequency locations or a descending order of the frequency locations.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   determining a lack of a suitable synchronization signal and physical broadcast channel block (SS/PBCH), a channel state information reference signal (CSI-RS) resource, or a combination thereof, within a first cell based at least in part on a link reconfiguration procedure;
   inhibiting, based at least in part on the determining, a retransmission of a physical random access channel (PRACH) preamble irrespective of a number of transmissions of the PRACH preamble being less than a threshold number of transmissions of the PRACH preamble; and sending an indication of a random access (RA) problem based at least in part on the inhibiting.

2. The method of claim 1, wherein sending the indication of the RA problem comprises sending the indication of the RA problem to a higher layer.

3. The method of claim 2, wherein sending the indication of the RA problem to the higher layer comprises sending the indication of the RA problem to a radio resource control (RRC) layer.

4. The method of claim 1, further comprising detecting beam failure and initiating a RA procedure, wherein the first cell is a primary cell.

5. The method of claim 1, further comprising initiating a radio resource control (RRC) connection reestablishment procedure in response to sending the indication of the RA problem.

6. The method of claim 5, wherein a RRC layer initiates the RRC connection reestablishment procedure.

7. The method of claim 5, wherein initiating the RRC connection reestablishment procedure comprises initiating the RRC connection reestablishment procedure with a second cell, the second cell is different from the first cell, and the second cell comprises user equipment (UE) context information.

8. The method of claim 7, further comprising receiving an indication corresponding to at least one dedicated PRACH resource of the second cell.

9. The method of claim 8, wherein the at least one dedicated PRACH resource of the second cell is activated based on a measurement report.

10. The method of claim 1, wherein sending the indication of the RA problem comprises sending the indication of the RA problem in response to:
measurements corresponding to SS/PBCHs exceeding a reference signal received power (RSRP) threshold;
a power limiting condition;
an inability to detect the SS/PBCHs; or
a combination thereof.

11. The method of claim 1, further comprising:
receiving configuration information corresponding to a plurality of dedicated PRACH resources of the first cell for beam failure recovery in the first cell;
receiving a medium access control (MAC) control element (CE) to activate a subset of the plurality of dedicated PRACH resources; and
determining the lack of the suitable SS/PBCH, the CSI-RS, or the combination thereof based at least in part on the subset of the plurality of dedicated PRACH resources, in response to finding a suitable SS/PBCH, CSI-RS resource, or a combination thereof associated with the subset of the plurality of dedicated PRACH resources.

12. An apparatus comprising:
a processor; and
a memory coupled to the processor, the memory comprising instructions executable by the processor to cause the apparatus to:
determine a lack of a suitable synchronization signal and physical broadcast channel block (SS/PBCH), a channel state information reference signal (CSI-RS) resource, or a combination thereof, within a first cell based at least in part on a link reconfiguration procedure;
inhibit, based at least in part on the determining, a retransmission of a physical random access channel (PRACH) preamble irrespective of a number of transmissions of the PRACH preamble being less than a threshold number of transmissions of the PRACH preamble; and
send an indication of a random access (RA) problem based at least in part on the inhibiting.

13. The apparatus of claim 12, wherein the instructions are further executable by the processor to cause the apparatus to send the indication of the RA channel to a higher layer.

14. The apparatus of claim 12, wherein the instructions are further executable by the processor to cause the apparatus to detect beam failure and initiating a RA procedure, and the first cell is a primary serving cell.

15. The apparatus of claim 12, wherein the instructions are further executable by the processor to cause the apparatus to initiate a radio resource control (RRC) connection reestablishment procedure in response to sending the indication of the RA problem.

16. The apparatus of claim 15, wherein a RRC layer initiates the RRC connection reestablishment procedure.

17. The apparatus of claim 15, wherein the instructions are further executable by the processor to cause the apparatus to initiate the RRC connection reestablishment procedure with a second cell, the second cell is different from the first cell, and the second cell comprises user equipment (UE) context information.

18. The apparatus of claim 17, wherein the instructions are further executable by the processor to cause the apparatus to receive an indication corresponding to at least one dedicated PRACH resource of the second cell.

19. The apparatus of claim 18, wherein the at least one dedicated PRACH resource of the second cell is activated based on a measurement report.

20. The apparatus of claim 12, wherein the instructions are further executable by the processor to cause the apparatus to send the indication of the RA problem in response to:
measurements corresponding to SS/PBCHs exceeding a reference signal received power (RSRP) threshold;
a power limiting condition;
an inability to detect the SS/PBCHs; or
a combination thereof.

* * * * *